Sept. 13, 1949.
J. W. GILLON ET AL
2,481,656
INTERCONNECTED CAMERA FINDER AND
FOCUS ADJUSTING MECHANISM
Filed June 6, 1946
2 Sheets-Sheet 1
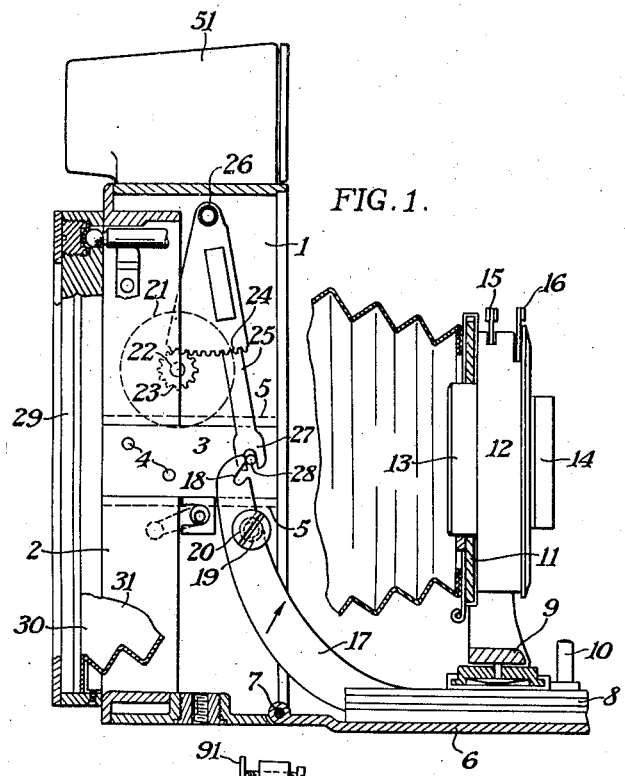
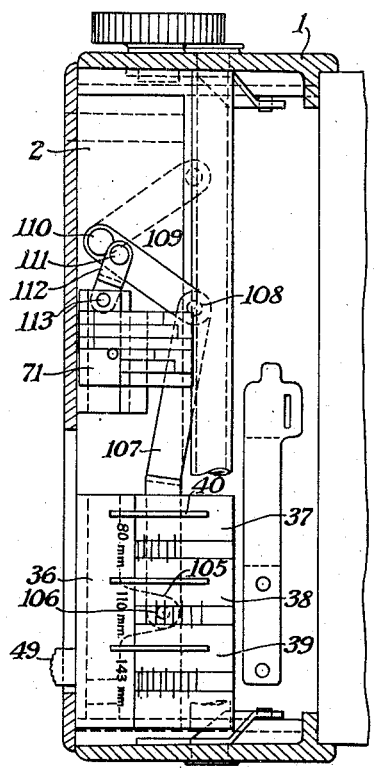
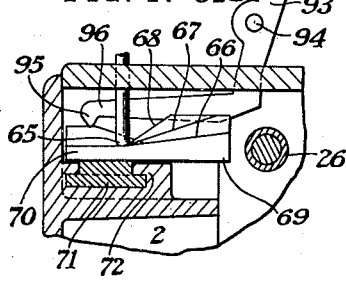
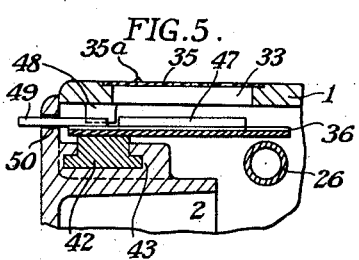
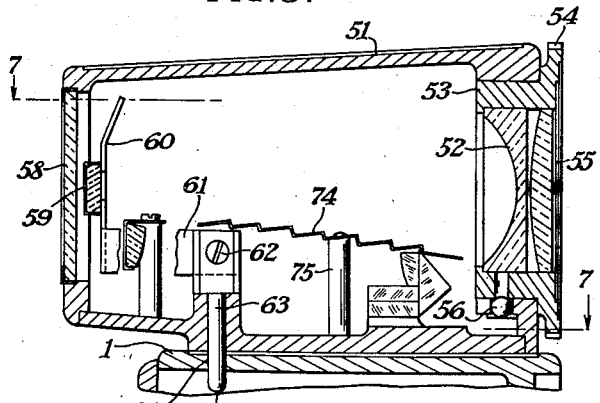
John W. Gillon and George A. Haraden
INVENTORS
BY
ATTORNEYS Sept. 13, 1949.                J. W. GILLON ET AL                2,481,656
                    INTERCONNECTED CAMERA FINDER AND
                       FOCUS ADJUSTING MECHANISM
Filed June 6, 1946                                          2 Sheets-Sheet 2
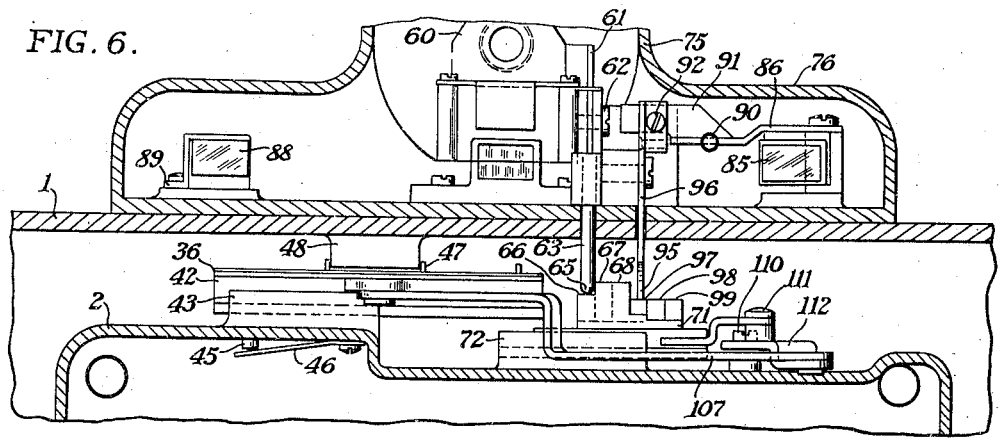
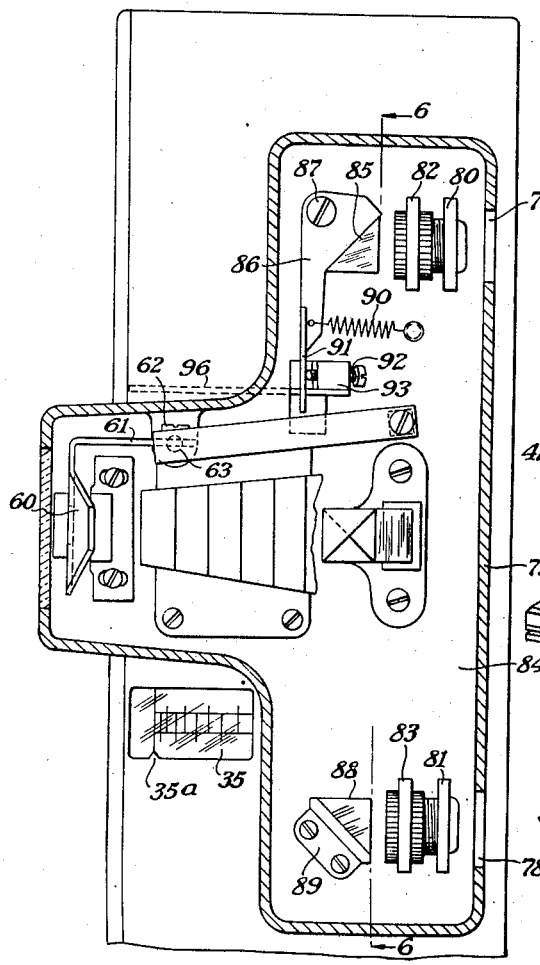
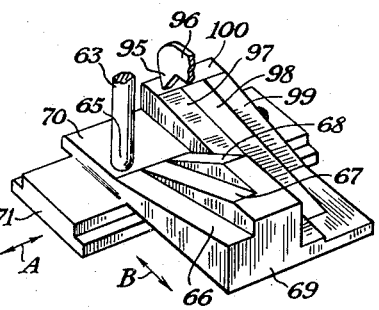
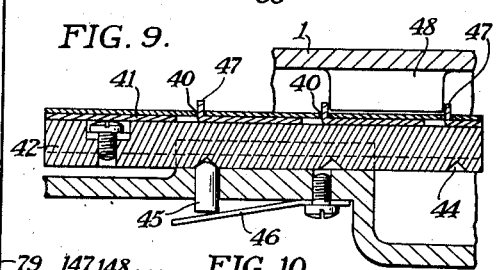
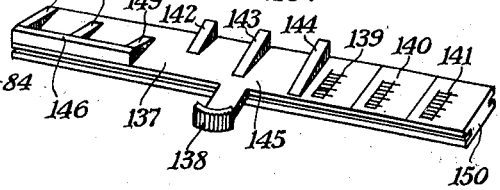
John W. Gillon and George A. Haraden
INVENTORS
BY
ATTORNEYS Patented Sept. 13, 1949

2,481,656

UNITED STATES PATENT OFFICE 2,481,656

INTERCONNECTED CAMERA FINDER AND FOCUS ADJUSTING MECHANISM

John Warren Gillon and George Albert Haraden, Rochester, N. Y., assignors to Eastman Kodak Company, Rochester, N. Y., a corporation of New Jersey Application June 6, 1946, Serial No. 674,881

7 Claims. (Cl. 95—44)

This invention relates to photography, and more particularly to adjusting mechanism for photographic cameras. One object of our invention is to provide a photographic camera particularly adapted for use with lenses of different focal lengths. Another object of our invention is to provide a camera of the class described in which a simple mechanism can be moved to properly adjust various parts for the use of a lens of a selected focal length. A still further object of our invention is to provide a camera of the class described with a range finder and view finder, both of which may be adjusted for a lens of selected focal length, so that the range finder will always indicate the proper focus, and so that the view finder will always be corrected for parallax. Other objects will appear from the following specification, the novel features being particularly pointed out in the claims at the end thereof.

It has been common practice to provide cameras having a single objective with a finder which automatically corrects for parallax and with a range finder which will indicate the proper focal setting of the objective. However, where lenses of different focal lengths are to be used, it has been much more difficult to automatically take care of the required adjustments for the view finder and range finder, and to automatically and simultaneously adjust both of these devices for a preselected focal length lens. One of the objects of our invention is to simplify an adjusting mechanism so the various optical parts of the camera can be quickly and easily adjusted when the focusing scale indicating the desired focal length lens is adjusted.

The adjusting mechanism for the focusing scale per se is claimed in a copending application in the names of John W. Gillon and George A. Haraden, filed June 6, 1946, Serial No. 674,882 and entitled "Focus adjusting mechanism for cameras", and now Patent No. 2,475,956, dated July 12, 1949.

Coming now to the drawings wherein like reference characters denote like parts throughout:

Fig. 1 is a part section and part side elevation of a camera constructed in accordance with and embodying a preferred form of our invention;

Fig. 2 is an enlarged fragmentary sectional view taken transversely through the camera shown in Fig. 1;

Fig. 3 is an enlarged sectional view through a housing containing a view finder and range finder;

Fig. 4 is an enlarged fragmentary detailed section showing a cam block and parts which the cam block may operate;

Fig. 5 is an enlarged fragmentary section showing a portion of the focus-indicating scale and pointer;

Fig. 6 is an enlarged sectional view taken on line 6—6 of Fig. 7 and showing the relationship of the two camera parts which may be adjusted one relative to the other for focusing;

Fig. 7 is an enlarged detail section taken on line 7—7 of Fig. 3 and showing a portion of the camera top in elevation;

Fig. 8 is a perspective detail showing a cam block;

Fig. 9 is an enlarged fragmentary section through a portion of the focusing scale-adjusting mechanism; and Fig. 10 is a detail perspective of a part of the camera-adjusting mechanism removed from the camera.

In the preferred embodiment of our invention shown in the drawings, the camera may consist of a camera body 1 of generally rectangular shape in which a frame 2 is mounted to slide, the frame 2 carrying a slide member 3 attached as by rivets 4 so that the slide may move freely between rails 5 carried on the side walls of the camera body 1. The camera body 1 may carry a bed 6 hinged at 7 to the camera body and carrying a track 8 on which a lens carriage 9 is mounted to slide, handles 10 being provided for moving the lens carriage out to a fixed position on the camera bed. The lens carriage 9 supports a lens board 11 to which a shutter 12 of a known type may be affixed; this shutter carrying a rear lens in the lens cell 13 and a front lens in the lens cell 14. The usual type of setting lever 15 and trigger 16 may be provided.

The camera bed 6 may be held at right angles to the camera body 1 by means of a pair of similar bed braces; each bed brace 17 being pivotally attached in a known manner to the camera bed 6 and being provided with spaced notches 18 and 19, either one of which may engage a stud 20. A spring, not shown, is used to thrust the bed braces 17 in the direction shown by the arrow and into engagement with the stud 19. As thus far described, the camera forms no part of our present invention.

In order to move one part of the camera relative to the other part for focusing, we prefer to provide a focusing knob 21 attached to a shaft 22 for turning a pinion 23; this pinion meshing with a gear segment 24 carried by an arm 25 attached to a tubular shaft 26 extending across the top of the camera. Each side of the camera carries an arm 25 attached to the tubular shaft 26 and there is a slot 27 in each arm engaging a pin 28 on one of the slides 3, so that when the focusing knob 21 is turned, the arms will move the slides 3 in their respective tracks 5 and cause part 2 of the camera to telescope more or less into the body formed by the camera part 1, thereby focusing the camera.

Camera part 2 is provided with a way 29 which receives a sensitized material holder, such as a plate holder, a film pack holder, a roll holder, or a cut film holder. It also carries the rear end 30 of a bellows 31, the front end 32 of which is attached to the lens board 11.

There is a window 33 in the top of camera part 1, as shown in Fig. 5, this window being preferably covered by glass, or transparent sheeting 35, and preferably carrying an arrow, or an inscribed line on the surface, or beneath the window, this being diagrammatically indicated at 35A. Beneath this window and pointer there is a sheet 36 of suitable material, such as a white card or plastic material, bearing a series of printed or engraved focusing scales 37, 38, and 39, as indicated in Fig. 2. As also indicated on the focusing scales themselves, scale 37 is for an 80-mm. lens; scale 38 is for a 110-mm. lens, and scale 39 is for 143-mm. lens, these lenses being selected as a useful range for a camera adapted to take 2¼ x 3¼, or 6 x 9, cm. pictures. Each sheet 36 is provided with a series of slots 40, all of which are parallel and the purpose of which, as indicated in Fig. 9, is to locate the focusing scale carrying sheet upon a supporting plate 41 which is carried by a slide 42. Slide 42, as best shown in Fig. 5, may be moved in the track 43 carried by camera part 2. A series of notches 44, shown in Fig. 9, are positioned to engage a pin 45 pressed upwardly by a spring 46 to hold the slide with its focusing scales in any one of three selected positions. Thus, any focusing scale may be moved beneath the window 33 and held in such a position by the pin 45 and notches 44.

The apertures 40 in the sheet 36 engage upstanding flanges 47 formed from the plate 41 and these are used both to locate the focusing scale sheet and to provide a means for preventing the focusing scale from being moved except when the focal setting is at infinity. To accomplish this, the structure shown in Figs. 5 and 9 is employed in which there is a downwardly-extending lug 48 carried by camera part 1 which is adapted to lie between two of the upstanding lugs 47 in such a manner that when the flanges engage the sides of the lug 48, the slide 42 cannot be moved transversely, but when the focal setting between the camera parts 1 and 2 is shown to be at infinity, the parts will lie in their Fig. 5 position in which the lug 48 lies beyond the end of the lugs 47 so that transverse movement can be then accomplished by moving the slide 42 by means of a handle 49 projecting through a slot 50 in the camera wall.

When the user selects a lens to be placed on the camera, if the lens, for instance, should be a 110-mm. lens, the handle 49 may be used to slide the focusing scale 38 into its operative position beneath the window 33. This has been suggested in the application of Gillon and Haraden, above referred to. However, it is also desirable to make the camera as foolproof as possible and it is, therefore, desirable to have the movement of handle 49 not only adjust the focusing scale properly for the selected lens, but to have this handle likewise adjust the optical parts of the camera. These optical parts may be either a view finder which may be corrected for parallax for lenses of different focal lengths, or, it may be a range finder which can be adjusted for use with lenses of different focal lengths, or, as in the preferred embodiment of our invention shown in the drawings, it may include both the range finder and the view finder.

In Fig. 1, the camera body portion 1 is shown equipped with a view finder 51 which does not include a range finder but which does include a parallax-correcting mechanism which will now be described.

The view finder 51 may include optical elements which are also used in a second embodiment of my invention which includes a range finder so that the optical parts will only be described once. The view finder is provided with a lens 52 which is carried in an oscillatable cell 53 having an upstanding and roughened flange 54 and having a front rectangular opening 55. The cell may be rotated through 90 degrees by means of the knurled edge 54 and may be held in a set selected position by means of a spring ball 56 entering either of two notches 57 in the oscillatable cell 53. The rear wall of the view finder is provided with a covered window 58, inside of which there is a view opening 59 carried by the mask plate 60. This plate is carried on the end of arm 61 attached by a screw 62 to a post 63 passing through an aperture 64 in the top wall of camera part 1 and projecting down to a rounded end 65 which constitutes a cam follower. This cam follower 65, as shown in Figs. 4 and 8, may engage any one of a series of cams 66, 67, and 68, formed on the cam block 69. Each of these cams is inclined at the proper angle for one of the three lenses used on this camera; that is, the 80, 110, or 143 millimeter lens. As shown in Figs. 4 and 8, all of these cams rise from a flat surface 70 on which the cam follower 65 rests when the camera focal setting is at infinity. When at infinity is is obvious that a slide 71 mounted to move transversely in a track 72 carried by the camera part 2 can move since the cam follower 65 will merely follow the flat surface 70. However, as soon as the knob 21 is turned to focus the camera on objects nearer than infinity, the cam follower 65 may ride up any one of the three cams, 66, 67, or 68, according to the position of the camblock 69. Since the flanges 48 and 47 prevent movement of the focusing scale sheet 36, and since the cam block 69 can only be moved when the focusing scale slide 42 is moved (as will be hereinafter described), it is impossible to move the slide 71 transversely when the cam follower 65 is engaged with any one of the cams 66, 67, or 68. Therefore, it is impossible to damage the mechanism, as might well occur if the slide 71 could be moved with the cam follower resting on a cam.

In Fig. 8, the arrow "A" designates the movement of the slide 71 and the arrow "B" indicates the movement of the cam block 69 with respect to the cam follower 65 since, of course, the cam block moves when the camera part 2 is moved for focusing.

With the construction above described, when the camera part 2 is moved, the cam follower 65 will slide on one of the three cams and thereby incline the optical axis of the view finder since the pin 63, through the arm 61, will raise, or lower, as the case may be, the peepsight 59. If only a view finder is used, the mechanism above described will be all that is required. In addition, there may be a light-guard plate 74, as shown in Fig. 3; this plate being supported by a post 75. The corrugations are merely to prevent reflection of light rays in the finder, this also being true of the masking plate 60. Thus, the entire mechanism for the view finder may be enclosed in the housing 51 of Fig. 1, or if a combined view finder and range finder is used, it may be included in the central portion 75 of a housing 76, shown in Figs. 6, 7, and 3. The housing 76 may include all of the optics necessary for a range and view finder. Thus, this housing will include the optical elements of the viewing device above described and, in addition, it may include the following range finder elements. Behind the windows 77 and 78 in the front wall 79 of the housing there may be located lenses in adjustable mounts 80 and 81. Behind each of these lenses are supports 82 and 83 carried by the bottom wall 84 of the housing. Each lens lies in front of a prism; one prism 85 being carried by a lever 86 which may turn about a pivot 87, and the other prism 88 being fixedly attached to the bottom wall 84 by means of a bracket 89. A spring 90 tends to move the lever 86 to engage a flange 91 with an adjusting screw 92 carried on the upper end 93 of a bell crank lever pivoted at 94 to the housing, and including a cam follower 95 on the lower arm 96 of the bell crank lever. This cam follower is positioned to engage any one of the cams 97, 98, or 99, as shown in Fig. 8; these cams all terminating in a flat surface 100 on which the cam follower 95 rests when the focal adjustment of the camera parts 1 and 2 is at an infinity position. When in this position, the slide 71 may move laterally and the cam follower may slide on the surface 100. When, however, the camera parts are adjusted to focus on objects closer than infinity, the cam will follow down whichever cam is in alignment.

We have provided a single means for simultaneously adjusting a slide to position a focusing scale, a parallax-correcting cam, and a range finder adjusting cam for any preselected lens. As indicated in Fig. 10, we provide a transverse slide 150 which carries a plate 145, this plate being slidable transversely of the camera body by means of a handle 138. If the camera employs three focal length lenses, there will be three focusing scales, 139, 140, and 141, any one of which may be positioned beneath a window 35 in the camera body 1, the slide preferably being carried by the focusing frame 2 of the camera. Three cams 142, 143, and 144 are mounted on the plate 145 carrying the focusing scales, these three cams being so positioned that one of the cams will be brought opposite the post 63 which operates the parallax-correcting mechanism when a focusing scale is selected. In a similar manner, one of the range finder cams, 147, 148, and 149 will be brought opposite the range finder focusing lever 96 through movement of the slide.

The cams, 147, 148, and 149 are connected by a flat surface 146 on which the end 95 of the focusing lever 96 travels during adjustments, or when the slide and the focusing lever are in an infinity position. The post 65 may slide on the surface 137 at the same time. The slide 150 may be provided with a spring detent, not shown but similar in construction to the detent 45, dropping into notches 44 indicated in Fig. 9. This is the simplest type of adjusting mechanism which can be used, but it has the disadvantage of taking up considerable room in the camera and if the camera should be a small one, it may be preferable to provide the type of multiplying adjusting mechanism shown in the drawings, this multiplying mechanism being specifically claimed in application Ser. No. 674,853, filed June 6, 1946 in the names of McAdam and Bauer. In this form of mechanism, a single cam block 69 with all of the cams for both the parallax correction and the view finder are made in a single compact block. The cam block is carried by a transverse slide 71, and this slide can only be moved when the slide carrying the focusing scale is moved because of the following linkage. The focusing scale slide 42, as best shown in Fig. 2, is provided with an ear 105 carrying a stud 106 to which a link 107 is pivoted; this link carrying a stud 108 pivotally connecting it to a link 109 pivotally mounted at 110 to the camera part 2. A pivot 111 carried by the link 109 supports one end of a link 112 pivotally attached at 113 to the cam slide 71. The ratio of the linkage is so arranged that while the focusing scale slide is moving a distance roughly equal to the width of one focusing scale, the cam block slide is moving a much shorter distance which is equivalent to the width of any one of the cams 66, 67, 68, 97, 98, or 99. Thus, each time the next adjacent focusing scale is positioned beneath the focusing window 33 in camera part 1, the next adjacent cam is positioned in alignment with the cam follower or the range finder mechanism or for the view finder parallax-correcting mechanism. Therefore, since these two slides must move together, it is impossible to adjust one without adjusting the other. If the operator moves the handle 49 to position the proper focusing scale in an operative position for the selected lens, the cams for the optical devices will also be adjusted without thought on the part of the operator. In other words, a single adjustment automatically positions the cam for operating the movable reflector 85 of the range finder and likewise automatically positions the cam in the path of the cam follower which automatically corrects the view finder for parallax for a selected lens.

In operation, our improved form of camera can be very easily and quickly adjusted by the mechanism which has been hereinabove described. If the operator should select a lens—say the 110-mm. lens—he then moves the handle 138, and if the handle is moved, the slide 150 will carry the proper focusing scale as, for instance, 140, beneath the window 33 where it may be viewed by an operator. When the slide 150 is moved, the parallax-correcting cams will be moved and the range finder cams will be moved so that the range finder and view finder adjusting mechanism will be adjusted with the focusing scale for the selected focal length lens. The operation will be the same when the ratio multiplying linkage of the McAdam and Bauer type is used except, of course, that the movement of the cam block is comparatively slight with respect to the movement of the focusing scale and a much more compact arrangement is provided.

We claim:

1. In an adjusting mechanism for cameras, the combination with a camera including two parts, comprising a camera body and a frame slidably mounted therein, means carried by the frame for supporting a film to be exposed; means for moving the frame relative to the camera body for focusing, a bed hinged to the camera body, an objective mounted to slide independently of the frame and on the bed to a selected position, said frame being movable axially of the objective to and from the objective in focusing, a focus-determining device comprising focusing scales mounted in spaced parallel relation on the frame and a pointer mounted on the camera body, the scales each having graduations for lenses of different focal lengths, a movable mount for adjusting a selected scale relative to the pointer and into an operative relation thereto, a split-field range finder including a movably-mounted reflector mounted on the camera body and including a cam follower, cams carried by the frame for coacting one at a time with the cam follower and for moving the reflector, said cams being in parallel and spaced relation and being movably mounted whereby one cam at a time may be moved into operative relationship with the cam follower, and means for simultaneously moving the focusing scales and cams to bring a correlated scale and cam into an operative position.

2. In an adjusting mechanism for cameras, the combination with a camera including two parts, comprising a camera body and a frame slidably mounted therein, means carried by the frame for supporting a film to be exposed; means for moving the frame relative to the camera body for focusing, a bed hinged to the camera body, an objective mounted to slide independently of the frame and on the bed to a selected position, said frame being movable axially of the objective to and from the objective in focusing, a focus-determining device comprising focusing scales mounted in spaced parallel relation on the frame and a pointer mounted on the camera body, the scales each having graduations for lenses of different local lengths, a movable mount for adjusting a selected scale relative to the pointer and into an operative relation thereto, a split-field range finder including a movably-mounted reflector mounted on the camera body and including a cam follower, cams carried by the frame for coacting one at a time with the cam follower and for moving the reflector, said cams being in parallel and spaced relation and being movably mounted whereby one cam at a time may be moved into operative relationship with the cam follower, and means for simultaneously moving the focusing scales and cams to bring a correlated scale and cam into an operative position, said means including a handle attached to the cams and slidably mounted with the cams on the frame.

3. In an adjusting mechanism for cameras, the combination with a camera including two parts, comprising a camera body and a frame slidably mounted therein, means carried by the frame for supporting a film to be exposed; means for moving the frame relative to the camera body for focusing, a bed hinged to the camera body, an objective mounted to slide independently of the frame and on the bed to a selected position, said frame being movable axially of the objective to and from the objective in focusing, a focus-determining device comprising focusing scales mounted in spaced parallel relation on the frame and a pointer mounted on the camera body, the scales each having graduations for lenses of different focal lengths, a movable mount for adjusting a selected scale relative to the pointer and into an operative relation thereto, a split-field range finder including a movably-mounted reflector mounted on the camera body and including a cam follower, cams carried by the frame for coacting one at a time with the cam follower and for moving the reflector, said cams being in parallel and spaced relation and being movably mounted whereby one cam at a time may be moved into operative relationship with the cam follower, and means for simultaneously moving the focusing scales and cams to bring a correlated scale and cam into an operative position, said means including a handle attached to the cams and slidably mounted with the cams on the frame, and a friction latch for holding the handle in a predetermined position.

4. In an adjusting mechanism for cameras, the combination with a camera including two parts, comprising a camera body and a frame slidably mounted therein, means carried by the frame for supporting a film to be exposed; means for moving the frame relative to the camera body for focusing, a bed hinged to the camera body, an objective mounted to slide independently of the frame and on the bed to a selected position, said frame being movable axially of the objective to and from the objective in focusing, a focus-determining device comprising focusing scales mounted in spaced and parallel relation on the frame and a pointer mounted on the camera body, the scales each having graduations for lenses of different focal lengths, a movable mount for adjusting a selected scale relative to the pointer and into an operative relation thereto, a split-field range finder including a movably-mounted reflector mounted on the camera body and including a cam follower, cams carried by the frame for coacting one at a time with the cam follower and for moving the reflector, said cams being in parallel and spaced relation and being movably mounted whereby one cam at a time may be moved into operative relationship with the cam follower, a view finder including an element tiltably mounted on the camera body, parallax-correcting cams for tilting the tiltable member movably mounted on the frame, the parallax-correcting cams being movably mounted for moving a selected cam into an operative position to tilt the tiltable member of the finder for a lens of selected focal length, and mechanism for moving the view finder parallax-correcting cams, the range finder cams and the focusing scales to operatively position a scale, a cam, and a parallax-correcting cam for a lens of a predetermined focal length.

5. In an adjusting mechanism for cameras, the combination with a camera including two parts comprising a camera body and a frame slidably mounted therein, means carried by the frame for supporting a film to be exposed; means for moving the frame relative to the camera body for focusing, a bed hinged to the camera body, an objective mounted to slide independently of the frame and on the bed to a selected position, said frame being movable axially of the objective to and from the objective in focusing, a focus-determining device comprising focusing scales mounted in spaced parallel relation on the frame and a pointer mounted on the camera body, the scales each having graduations for lenses of different focal lengths, a movable mount for adjusting a selected scale relative to the pointer and into operative relation thereto, a view finder carried by the camera body, means for tilting the field of view of the finder to correct for parallax including a pin constituting a cam follower, cams in parallel spaced relation for contacting with the pin, and means for sliding a selected cam into position to contact with the pin, said means also being connected to move the movable mount for the focusing scales.

6. In an adjusting mechanism for cameras, the combination with a camera including two parts comprising a camera body and a frame slidably mounted therein, means carried by the frame for supporting a film to be exposed; means for moving the frame relative to the camera body for focusing, a bed hinged to the camera body, an objective mounted to slide independently of the frame and on the bed to a selected position, said frame being movable axially of the objective to and from the objective in focusing, a focus-determining device comprising focusing scales mounted in spaced parallel relation on the frame and a pointer mounted on the camera body, the scales each having graduations for lenses of different focal lengths, a movable mount for adjusting a selected scale relative to the pointer and into operative relation thereto, a view finder carried by the camera body, means for tilting the field of view of the finder to correct for parallax including a pin constituting a cam follower, cams in parallel spaced relation for contacting with the pin, and means for sliding a selected cam into position to contact with the pin, said means also being connected to move the movable mount for the focusing scales, the said focusing scales, cams, and parallax-correcting cams being connected for simultaneous adjustment for a lens of a predetermined focal length, and a single means for making the simultaneous adjustment.

7. In an adjusting mechanism for cameras, the combination with a camera including two parts, comprising a camera body and a frame slidably mounted therein, means carried by the frame for supporting a film to be exposed; means for moving the frame relative to the camera body for focusing, a bed hinged to the camera body, an objective mounted to slide independently of the frame and on the bed to a selected position, said frame being movable axially of the objective to and from the objective in focusing, a focus-determining device comprising focusing scales mounted in spaced parallel relation on the frame and a pointer mounted on the camera body, the scales each having graduations for lenses of different focal lengths, a movable mount for adjusting a selected scale relative to the pointer and into operative relation thereto, a view finder carried by the camera body, means for tilting the field of view of the finder to correct for parallax including a pin constituting a cam follower, cams in parallel spaced relation for contacting with the pin, and means for sliding a selected cam into position to contact with the pin, said means also being connected to move the movable mount for the focusing scales, the said focusing scales, cams, and parallax-correcting cams being connected for simultaneous adjustment for a lens of a predetermined focal length, and a single means for making the simultaneous adjustment; said single means for making the simultaneous adjustment including a handle attached to the cams, parallax-correcting cams, and focusing scales to move them together and means for retaining said handle in different fixed positions with respect to the frame whereby movement of the frame relative to the camera body may move the cams, parallax-correcting cams, and the focusing scales.

JOHN WARREN GILLON.
GEORGE ALBERT HARADEN.

REFERENCES CITED

The following references are of record in the file of this patent:

UNITED STATES PATENTS

| Number | Name | Date |
|---|---|---|
| 2,123,494 | Barnack | July 12, 1938 |
| 2,220,021 | Ort | Oct. 29, 1940 |
| 2,353,227 | Drotning | July 11, 1944 |
| 2,408,184 | Aiken | Sept. 24, 1946 |

FOREIGN PATENTS

| Number | Country | Date |
|---|---|---|
| 531,524 | France | Oct. 26, 1921 |
| 543,554 | France | June 7, 1922 |
| 398,045 | Germany | July 10, 1924 |